UNITED STATES PATENT OFFICE.

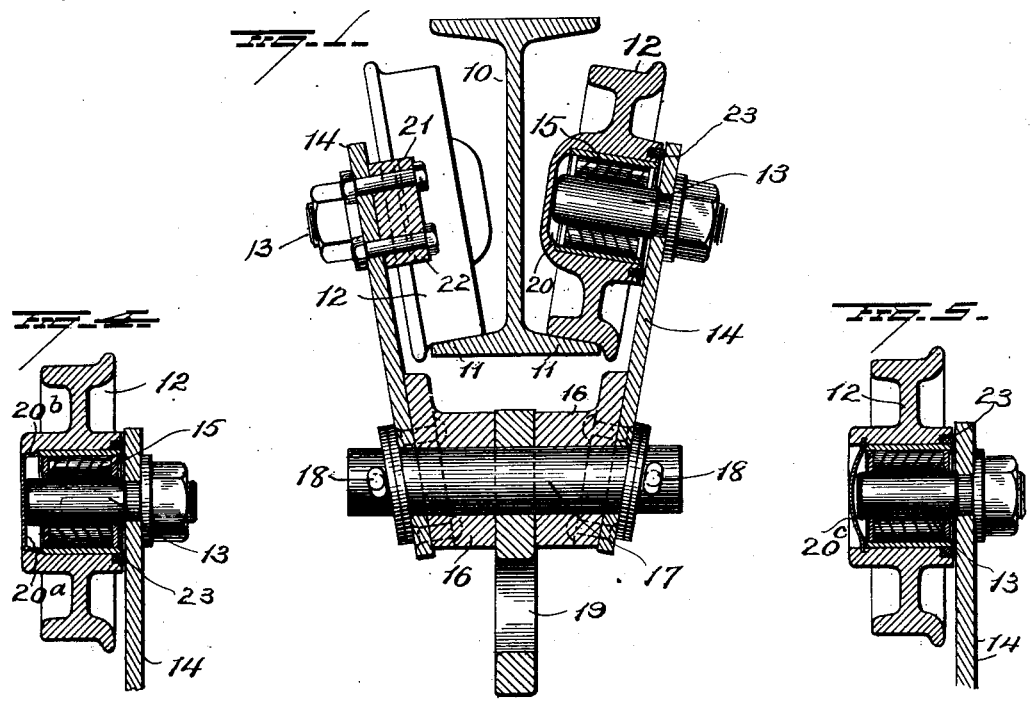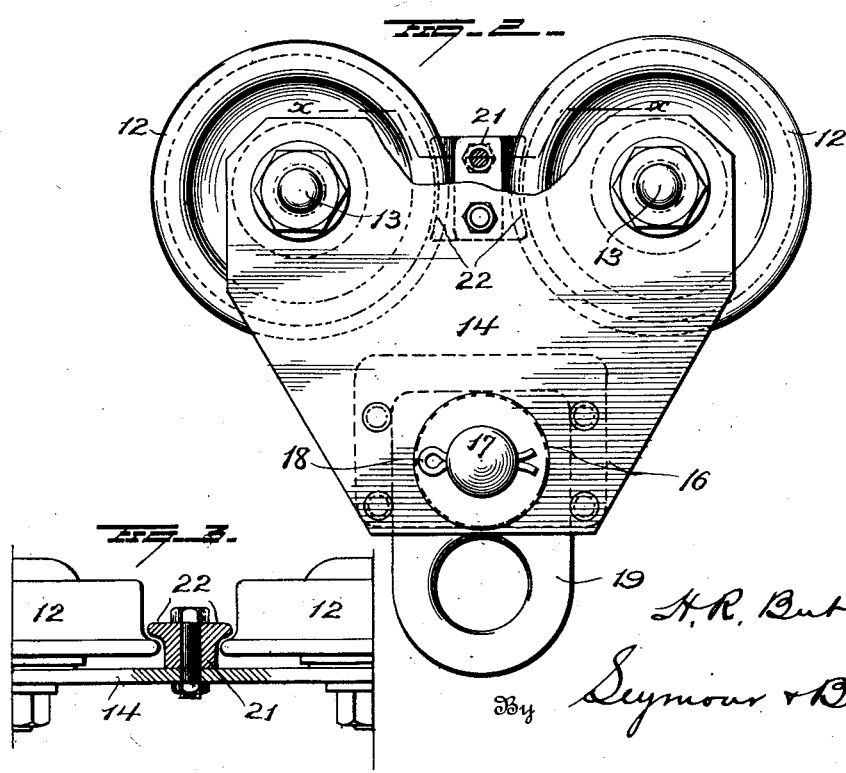

HARRY R. BUTLER, OF PELHAM MANOR, NEW YORK, ASSIGNOR TO THE YALE & TOWNE MANUFACTURING COMPANY, OF STAMFORD, CONNECTICUT.

HOIST-TROLLEY.

1,390,981.

Specification of Letters Patent.    Patented Sept. 20, 1921.

Application filed January 18, 1921.   Serial No. 438,156.

*To all whom it may concern:*

Be it known that I, HARRY R. BUTLER, a citizen of the United States and a resident of Pelham Manor, in the county of Westchester and State of New York, have invented certain new and useful Improvements in Hoist Trolleys; and I do hereby declare the following to be a full, clear, and exact description of the invention, such as will enable others skilled in the art to which it appertains to make and use the same.

The invention relates to an improvement in hoist trolley, comprising a frame having the flanged wheels which travel on the base or lower flange of an I beam or rail, the object of the invention being to provide means for protecting the bearing of the trolley wheels from dust.

A further object is to provide means for holding the trolley wheels in position on their bearings when the trolley is removed from the supporting rail.

With these objects in view my invention consists in the parts as will be more fully explained and pointed out in the claims.

In the accompanying drawings, Figure 1 is a view in section through a supporting rail and the trolley; Fig. 2 is a view in elevation showing the means for holding the trolley wheels on the stub axles; Fig. 3 is a view in section on the line $x—x$ of Fig. 2 and Figs. 4 and 5 are views in section of modifications.

10 represents a supporting rail having base flanges 11 on which the trolley wheels 12 travel. These wheels, two to each side of the trolley, are mounted to rotate on the stub axles 13, rigidly secured to the side plates or frames 14 of the trolley, at right angles to the latter, and support the roller bearings 15 on which the wheels 12 are directly mounted. The two side frames on plates 14 of the trolley are inclined to conform to the inclined top faces of the base flange 11 of the rail 10, and each is provided at its lower end and in a plane below the lower flange of the rail 10, with a hollow flanged block 16 riveted directly to the side plates or frames 14 of the trolley to provide enlarged or extended bearing for the equalizing pin 17 which is mounted at its ends in said block, passes through both side frames or plates and is detachably secured in place by cotter pins 18 passing through holes in the equalizing pin, or the latter may be headed at one end and held in place by a cotter pin 18 at the other end.

The equalizing pin 17 carries the load supporting plate 19 which is mounted on the pin 17 between the inner or adjacent ends of the block 16, so that when the parts are assembled the trolley frame as a whole is held in position by the pin 17.

The side plates or frames 14 are preferably triangular in shape with their apices projecting downwardly to receive the pin 17, and each plate carries two flanged or track wheels 12 each of which is carried on a stub axle 13. Each wheel is mounted on a roller bearing carried by the axles as described and the hub of each wheel is closed at its inner end or end adjacent the track rail 10, such closure 20 being preferably cast integral with the wheel as shown in Fig. 1.

The stub axles 13 extend inwardly approximately the length of the hub, and terminate adjacent the integral closure 20 so as to take the outward thrust of the wheels.

From the foregoing it will be seen that the wheels 12 are unsupported against inward displacement. When the trolley is mounted on a rail, the inclination of the top surfaces of the base flange, and the flanges of the wheels, prevent any tendency of the wheels 12 to move inwardly or toward the rail, and to prevent displacement of the wheels from the axles during shipment, or when the trolley is not on its carrying rail, I provide the retaining blocks 21 shown in Figs. 2 and 3. These blocks one for each plate 14 are bolted or otherwise secured to the inner faces of the said plate, and each block has flanges 22 that overlap the flanges of the wheels 12 for preventing the latter from sliding off their studs or axles 13 during shipment, or when the trolley is removed from the rail for repairs, but which do not contact with said flanges, or interfere in the slightest with the free rotation of the wheels when the trolley is mounted on a rail.

The outer or front face of the hub of each wheel 12 is provided with an annular recess to receive a felt packing strip 23 which bears against the inner surfaces of the plates 14 and prevents the entrance of dust or dirt to the bearing at the front or outer side of the roller bearing for the hub.

Instead however of permanently closing the outer end of the hub as in Fig. 1, I may use dust caps as shown in Figs. 4 and 5. In the construction shown in Fig. 4, the cap 20ª is made of sheet metal with an inwardly projecting flange 20ᵇ which latter is inserted in the outer open end of the hub, and in Fig. 5 the dust cap 20ᶜ is made of sheet metal of cancavo-convex shape and its periphery is sprung into an annular groove formed in the inner bearing face of the hub of the wheel.

I prefer however the construction of dust cap or solid hub shown in Fig. 1 as it in addition to forming a protection against the dust, also takes any outward thrust of the wheel by contacting with the end of the stub axle on which the wheel is mounted.

It is evident that many slight changes might be resorted to in the relative arrangement of the parts shown and described without departing from the spirit and scope of my invention hence I would have it understood that I do not wish to confine myself to the exact construction and arrangement of parts shown and described, but Having fully described my invention what I claim as new and desire to secure by Letters-Patent, is:—

1. In a hoist trolley, the combination of side frames or plates each having a stub axle for a track wheel, a wheel mounted on each axle and unsecured thereto whereby it is free to be moved in the direction of the length of the axle, the end of the hub of the wheel adjacent the free end of the axle being closed to prevent the entrance of dust.

2. In a hoist trolley, the combination of side frames, a stub axle on each side frame, a track wheel mounted on each axle and unsecured thereto whereby it is free to move in the direction of the length of the axle, the end of the hub of the wheel adjacent the free end of the axle being closed by a closure formed integral with the wheel.

3. In a hoist trolley, the combination of side frames each having a stub axle, a track wheel mounted on each axle, the end of the hub adjacent the free end of the axle being closed, and a yielding packing carried by each wheel and bearing against a side frame, the said yielding packing surrounding the axle for preventing the entrance of dust to the bearing.

4. In a hoist trolley, the combination of side frames each carrying two stub axles, means connecting the side frames at their lower ends, a track wheel mounted on each stub axle and retaining blocks secured to each side frame and overlapping the flanges of the two wheels mounted on said frame.

5. In a hoist trolley, the combination of side frames each carrying two stub axles, means connecting the side frames at their lower ends, a track wheel mounted on each stub axle, and a retaining block for each pair of wheels, the said retaining blocks being secured to the inner faces of the side frame, intermediate the wheels thereon and overhanging the flanges of said wheels.

6. In a hoist trolley, the combination of side frames each having a stub axle, a track wheel mounted on each axle, the end of the hub adjacent the free end of the axle being closed, and a packing interposed between each wheel and side frame of the latter, the said packing surrounding the axle for preventing the entrance of dust to the bearing.

In testimony whereof I have signed this specification in the presence of two subscribing witnesses.

HARRY R. BUTLER.

Witnesses:
R. P. ANDERSON,
H. J. FULLER.